(12) United States Patent
Tsuji et al.

(10) Patent No.: US 7,396,865 B2
(45) Date of Patent: Jul. 8, 2008

(54) OXYGEN ABSORBER, METHOD FOR PRODUCING THE SAME, AND PACKAGING MATERIAL USING THE SAME

(75) Inventors: Yoshihisa Tsuji, Kurashiki (JP); Mie Kodani, Kurashiki (JP); Tomoyuki Watanabe, Kurashiki (JP); Hideharu Iwasaki, Kurashiki (JP)

(73) Assignee: Kuraray Co., Ltd., Kurashiki-Shi (JP)

( * ) Notice: Subject to any disclaimer, the term of this patent is extended or adjusted under 35 U.S.C. 154(b) by 0 days.

(21) Appl. No.: 11/332,179

(22) Filed: Jan. 17, 2006

(65) Prior Publication Data
US 2006/0116452 A1   Jun. 1, 2006

Related U.S. Application Data

(63) Continuation of application No. PCT/JP2004/010402, filed on Jul. 22, 2004.

(30) Foreign Application Priority Data

Jul. 24, 2003   (JP) ............................. 2003-279029

(51) Int. Cl.
   *C08K 5/3415*   (2006.01)
   *C08K 5/17*   (2006.01)
(52) U.S. Cl. ...................... 524/87; 524/104
(58) Field of Classification Search ........... 524/87, 524/104
See application file for complete search history.

(56) References Cited

U.S. PATENT DOCUMENTS

| | | | |
|---|---|---|---|
| 4,598,006 A | 7/1986 | Sand | |
| 4,820,752 A | 4/1989 | Berens et al. | |
| 5,346,644 A | 9/1994 | Speer et al. | |
| 5,508,060 A | 4/1996 | Perman et al. | |
| 6,486,265 B1 * | 11/2002 | Ishii et al. ............... | 525/375 |

FOREIGN PATENT DOCUMENTS

| | | |
|---|---|---|
| EP | 546546 | 6/1993 |
| EP | 1 032 038 A2 | 8/2000 |
| EP | 1 055 654 A1 | 11/2000 |
| EP | 1120438 | 8/2001 |
| JP | 2-173150 | 7/1990 |
| JP | 5-115776 | 5/1993 |
| JP | 5-156095 | 6/1993 |
| JP | 6-269662 | 9/1994 |
| JP | 8-38909 | 2/1996 |
| JP | 8-506612 | 7/1996 |
| JP | 11-255925 | 9/1999 |
| JP | 2000-290312 | 10/2000 |
| JP | 2002-241610 | 8/2002 |
| JP | 2002-249174 | 9/2002 |
| WO | WO 00/35835 | 6/2000 |
| WO | 00-61665 | 10/2000 |
| WO | WO 00/61665 * | 10/2000 |
| WO | WO 01/90238 A2 | 11/2001 |

OTHER PUBLICATIONS

Ishii, et al., Chemistry, vol. 56, No. 7, 2001, pp. 18-23.
Yasutaka Ishii, et al., "Development of Catalytic Radical Generation and Its Application to Organic Synthesis", Journal of Synthetic Organic Chemistry, vol. 59, No. 1, 2001, pp. 4-12.

* cited by examiner

*Primary Examiner*—Kriellion A Sanders
(74) *Attorney, Agent, or Firm*—Oblon, Spivak, McClelland, Maier & Neustadt, P.C.

(57) ABSTRACT

An oxygen absorber of the present invention includes at least one compound represented by Formula (1):

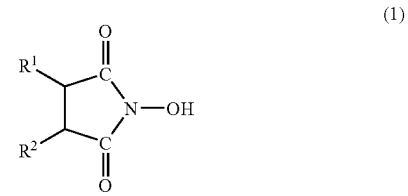

(1)

and an oxidizable polymer. $R^1$ and $R^2$ each independently indicates a hydrogen atom or an organic group. $R^1$ and $R^2$ may form a ring together with carbon atoms to which they are bonded. $R^1$ and/or $R^2$ may form a carbon-carbon double bond with carbon atoms to which they are bonded.

13 Claims, No Drawings

OXYGEN ABSORBER, METHOD FOR PRODUCING THE SAME, AND PACKAGING MATERIAL USING THE SAME

TECHNICAL FIELD

The present invention relates to an oxygen absorber, a method for producing the same, and a packaging material using the same.

BACKGROUND ART

Conventionally, a method in which an iron compound that is used as an oxygen absorber is dispersed in resin to be allowed to exhibit its function has been known as a method of absorbing oxygen (for instance, JP2002-249174A). There, however, has been a problem that since, for instance, iron oxide is used as an oxygen absorber, the oxygen absorber dissolves in water to elute. Furthermore, one molecule of iron compound absorbs only one molecule of oxygen. Accordingly, in order to absorb a sufficiently large amount of oxygen, a large amount of iron compound is necessary.

Furthermore, an oxygen-absorbing material also has been known that includes a transition metal compound (a catalyst) and an oxidizable polymer. For instance, a composition has been disclosed that is obtained by adding 10 to 100000 ppm of transition metal compound expressed in terms of metal, such as cobalt, iron, manganese, etc., to polyamide containing at least 40 mol % of m-xylylene adipamido (MXD6 nylon) (JP2002-241610A).

JP5(1993)-115776A discloses a composition containing ethylenically unsaturated hydrocarbon such as polybutadiene, polyisoprene, a styrene-butadiene copolymer, carotenoid, etc. and a transition metal compound such as cobalt, manganese, iron, nickel, copper, etc.

The PCT pamphlet of WO01/90238 discloses a composition that contains a polymer having an unsaturated bond, a transition metal compound, and a polymer having an oxygen barrier property, for the purpose of obtaining a composition having both the oxygen barrier property and an oxygen scavenging property.

Moreover, JP5(1993)-156095A discloses a resin composition with an oxygen barrier property. This composition is obtained by dispersing an oxygen-absorbing composition containing a polyolefin such as polyethylene, polypropylene, an ethylene-alpha olefin (with at least three carbon atoms) copolymer, etc. and an oxidation catalyst made of a compound of transition metal such as cobalt, manganese, iron, copper, nickel, etc., in a saponified ethylene-vinyl acetate copolymer.

In the case of a conventional oxygen-absorbing material containing an oxidizable polymer and a transition metal compound, oxygen contained in the air is absorbed when the polymer is oxidized. In this case, the transition metal compound has an effect of promoting the oxidation of the polymer. Hence, in order to allow the oxygen-absorbing material to exhibit sufficiently high oxygen absorbency, a certain amount of transition metal compound is required. However, when it is used as a packaging material for goods such as food, drink, medical supplies, cosmetics, etc., it is desirable to limit the amount of the transition metal compound to be used, in consideration of the safety. Accordingly, with the conventional oxygen-absorbing material containing a transition metal compound and an oxidizable polymer as essential constituent elements, it is not easy to meet such contradictory conditions and thereby to obtain a material that can satisfy both the safety and the oxygen absorbency.

On the other hand, methods have been disclosed in which various alkanes, alkenes, and various high molecular compounds are oxidized using an N-hydroxyphthalimide that serves as an oxidation catalyst. For instance, it has been disclosed that an N-hydroxyimide compound that coexists with various metal salts reacts with oxygen contained in the air to serve as an oxidation catalyst for alkane, alkene, and alcohol (Chemistry Vol. 56, No. 7, 18-23 (2001) and Journal of Synthetic Organic Chemistry, Vol. 59, No. 1, 4-12 (2001)).

Furthermore, a method has been disclosed in which various polymers are denatured with gas containing oxygen atoms using an N-hydroxyimide compound as a catalyst (JP2000-290312A). It is described that this method allows a polar group to be introduced efficiently into a polymer without cutting the main chain of the polymer and as a result, a polymer can be obtained that is excellent in antistatic property, etc.

These oxidation reactions, however, are allowed to occur in the presence of a polar solvent such as acetic acid, etc., i.e. in the presence of a solvent that absorbs oxygen actively. These reactions are oxidation reactions that occur between a liquid phase and a liquid phase or between a solid phase and a liquid phase and therefore are predicated on the intervention of transition metal and the flow of a catalyst that occurs in the liquid. On the other hand, it is required that the oxygen-absorbing material maintains its solid state even when it absorbs oxygen. Accordingly, the reaction that is required to take place in the oxygen-absorbing material is the reaction that occurs between the solid phase and the vapor phase. However, possibilities of the occurrence of such a reaction have not been studied at all.

DISCLOSURE OF INVENTION

With such situations in mind, it is an object of the present invention to provide an oxygen absorber that exhibits sufficiently high oxygen absorbency and is highly safe, and a method for producing the same.

In order to achieve the above-mentioned object, an oxygen absorber of the present invention includes at least one compound represented by Formula (1) indicated below and an oxidizable polymer.

Formula 1

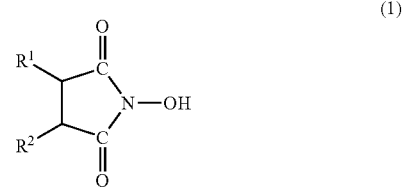

In the formula, $R^1$ and $R^2$ each independently indicates a hydrogen atom or an organic group. $R^1$ and $R^2$ may form a ring together with the carbon atoms to which they are bonded. $R^1$ and/or $R^2$ may form a carbon-carbon double bond with the carbon atoms to which they are bonded.

In the oxygen absorber of the present invention, the above-mentioned $R^1$ and $R^2$ each may indicate independently a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, an amino group protected by a protecting group, a dialkylamino group, an amide group, a sulfonic group, metal salt of a sulfonic group, a sulfonic ester group, a group expressed by a formula of —OP(=O)(OH)$_2$, metal salt or an ester derivative of a group expressed by a formula of —OP(=O)(OH)$_2$, a group expressed by a formula of —P(=O)(OH)$_2$, or metal salt or an ester derivative of a group expressed by a formula of —P(=O)(OH)$_2$.

In the oxygen absorber of the present invention, the polymer may contain a tertiary carbon atom.

Furthermore, in the oxygen absorber of the present invention, the compound may be N-hydroxyphthalimide.

A packaging material of the present invention includes a part made of an oxygen absorber of the present invention.

A method for producing an oxygen absorber according to the present invention includes: (i) preparing a mixture containing at least one compound represented by Formula (1) indicated above, an oxidizable polymer, and a solvent; and (ii) removing the solvent from the mixture.

Another method for producing an oxygen absorber according to the present invention includes: (i) applying a mixture to an oxidizable polymer, with the mixture containing at least one compound represented by Formula (1) indicated above and a solvent; and (ii) removing the solvent from the mixture applied to the polymer.

In Formula (1) mentioned above that is described in the aforementioned production methods, $R^1$ and $R^2$ each may indicate independently a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, an amino group protected by a protecting group, a dialkylamino group, an amide group, a sulfonic group, metal salt of a sulfonic group, a sulfonic ester group, a group expressed by a formula of —OP(=O)(OH)$_2$, metal salt or an ester derivative of a group expressed by a formula of —OP(=O)(OH)$_2$, a group expressed by a formula of —P(=O)(OH)$_2$, or metal salt or an ester derivative of a group expressed by a formula of —P(=O)(OH)$_2$.

According to the present invention, an oxygen absorber (an oxygen-absorbing composition) can be obtained that exhibits sufficiently high oxygen absorption and is highly safe. This oxygen absorber can be used as an absorber that absorbs oxygen remaining in a sealed container, for example. Moreover, this oxygen absorber also can be used as a packaging material. According to the production methods of the present invention, oxygen absorbers can be produced in which an oxidizable polymer and an N-hydroxyimide compound are dispersed uniformly.

BEST MODE FOR CARRYING OUT THE INVENTION

Hereinafter, embodiments of the present invention are described. In the following description, specific compounds may be indicated, as examples, as substances that exhibit particular functions but the present invention is not limited thereto. Furthermore, materials to be indicated as examples may be used individually or a combination thereof may be used unless otherwise described.

The oxygen absorber of the present invention includes at least one compound represented by Formula (1) indicated above (hereinafter, also referred to as an "N-hydroxyimide compound") and an oxidizable polymer.

The oxygen absorber of the present invention includes an oxidizable polymer as an essential component. This polymer is not particularly limited as long as it can react with oxygen by a radical mechanism in the presence of an N-hydroxyimide compound represented by Formula (1).

For example, a hydrocarbon-based polymer may be used as the oxidizable polymer. Specifically, it may be: a polyolefin-based polymer such as polyethylene, polypropylene, etc.; a styrene-based polymer such as polystyrene, polyparamethylstyrene, etc.; or a diene-based polymer such as polybutadiene, polyisoprene, etc. or a hydrogenated product of a diene-based polymer. Furthermore, a copolymer of an aromatic vinyl compound and conjugated diene or a hydrogenated product thereof may be used. For example, it may be a styrene-butadiene diblock copolymer or a hydrogenated product thereof, a styrene-isoprene diblock copolymer or a hydrogenated product thereof, a styrene-butadiene random copolymer or a hydrogenated product thereof, a styrene-isoprene random copolymer or a hydrogenated product thereof, a styrene-butadiene-styrene triblock copolymer or a hydrogenated product thereof, a styrene-isoprene-styrene triblock copolymer or a hydrogenated product thereof, etc. In addition, a ring-opened polymer of cyclic olefin such as cyclooctene, norbornene, etc. or a hydrogenated product thereof may be used. Moreover, copolymers of the above-mentioned cyclic olefin and acyclic olefin (ethylene, propylene, etc.) or hydrogenated products thereof may be used, for example.

Such a hydrocarbon-based polymer may be a denatured polymer having a functional group such as an epoxy group, a carboxyl group, an acid anhydride group, an alkoxycarbonyl group, a hydroxyl group, an amino group, an amide group, a mercapto group, a cyano group, etc.

Nylon 6, nylon 11, or nylon 12 may be used as the oxidizable polymer. Various polyamides also may be used that are composed of a diamine component such as tetramethylenediamine, hexamethylenediamine, nonamethylenediamine, 1,2-dibenzylamine, 1,3-dibenzylamine, 1,4-dibenzylamine, etc. and a dicarboxylic acid component such as adipic acid, terephthalic acid, dihydroterephthalic acid, tetrahydroterephthalic acid, tetrahydrophthalic acid, isophthalic acid, etc. Furthermore, various polyesters may be used that are composed of a diol component such as ethylene glycol, tetramethylene glycol, 2-butene-1,4-diol, 5-cyclooctene-1,2-diol, 3-cyclohexene-1,1-dimethanol, etc. and a dicarboxylic acid component such as adipic acid, terephthalic acid, dihydroterephthalic acid, tetrahydroterephthalic acid, tetrahydrophthalic acid, isophthalic acid, naphthalenedicarboxylic acid, etc.

Polyvinyl alcohol polymers such as polyvinyl alcohol (PVA), etc. or polyvinyl acetal polymers such as polyvinyl butyral (PVB), polyvinylformal, etc. also may be used. Moreover, an ethylene-vinyl alcohol copolymer (EVOH) may be used. Acrylic polymers also may be used including polyacrylic acid, polymethacrylic acid, polyacrylic ester, polymethacrylic ester, etc. Furthermore, polyacrylamide may be used. A copolymer of olefin and unsaturated carboxylic acid such as an ethylene-acrylic acid copolymer, an ethylene-octene-acrylic acid copolymer, etc. may be used, and salts of them and metal such as zinc, copper, etc. also may be used. In addition, a polycarbonate-based polymer; polyacrylonitrile; polyacetal; or polyvinyl chloride, polyvinylidene chloride, polyvinylidene fluoride, etc. may be used. Moreover, a natural high polymer such as cellulose, starch, polylactic acid, agar, gelatin, etc. may be used.

One polymer alone or a combination of two polymers or more may be used for the oxidizable polymer.

Preferably, the oxidizable polymer is a polymer having a secondary or tertiary carbon atom or a polymer having an aliphatic carbon-carbon double bond since such a polymer has excellent oxygen absorbency. Among them, the polymer having a tertiary carbon atom is preferable in view of the fact that it reacts with oxygen efficiently by a radical mechanism in the presence of an N-hydroxyimide compound. Furthermore, the use of a polymer having an aliphatic carbon-carbon double bond that has high radical reactivity is particularly preferable from the view point of the rate at which oxygen is absorbed.

Examples of the oxidizable polymer having an aliphatic carbon-carbon double bond include: diene-based polymers such as polybutadiene, polyisoprene, etc.; ring-opened polymers of cyclic olefin such as cyclooctene, norbornene, etc.; and hydrocarbon-based polymers such as copolymers of the above-mentioned cyclic olefin and acyclic olefin such as ethylene, propylene, etc.

Examples of the oxidizable polymer having a tertiary carbon atom include hydrocarbon-based polymers having a tertiary carbon atom. For example, it can be a polyolefine-based polymer such as polypropylene, etc., a diene-based polymer such as polybutadiene, polyisoprene, etc., or a hydrogenated product thereof. Furthermore, it also can be a copolymer of an aromatic vinyl compound and conjugated diene or a hydrogenated product thereof, such as a styrene-butadiene diblock copolymer or a hydrogenated product thereof, a styrene-isoprene diblock copolymer or a hydrogenated product thereof, a styrene-butadiene random copolymer or a hydrogenated product thereof, a styrene-isoprene random copolymer or a hydrogenated product thereof, a styrene-butadiene-styrene triblock copolymer or a hydrogenated product thereof, a styrene-isoprene-styrene triblock copolymer or a hydrogenated product thereof, etc. Moreover, a hydrogenated product of a ring-opened polymer of cyclic olefin such as cyclooctene, norbornene, etc. also may be used. In addition, a hydrogenated product of a copolymer of the above-mentioned cyclic olefin and acyclic olefin such as ethylene, propylene, etc. also may be used.

The molecular weight of the oxidizable polymer is not particularly limited. However, the number-average molecular weight (Mn) is preferably in the range of 1,000 to 1,000,000, more preferably in the range of 3,000 to 500,000, further preferably in the range of 10,000 to 300,000, and particularly preferably in the range of 20,000 to 200,000. Since the oxidizable polymer is used for an oxygen absorber, the molecular weight thereof is preferably in the range of 20,000 to 200,000 from the viewpoints of the formability/processability and mechanical property of the oxygen absorber, as well as the dispersibility thereof with respect to other materials.

Another essential component that composes the oxygen absorber of the present invention is an N-hydroxyimide compound represented by Formula (1) indicated above.

In Formula (1) indicated above, $R^1$ and $R^2$ each independently denotes a hydrogen atom or an organic group. $R^1$ and $R^2$ may form a ring together with the carbon atoms to which they are bonded. Furthermore, $R^1$ and/or $R^2$ may form a carbon-carbon double bond with the carbon atoms to which they are bonded.

In a preferable example, $R^1$ and $R^2$ each independently indicates a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, an amino group protected by a protecting group, a dialkylamino group, an amide group, a sulfonic group, metal salt of a sulfonic group, a sulfonic ester group, a group expressed by a formula of —OP(=O)(OH)$_2$, metal salt or an ester derivative of a group expressed by a formula of —OP(=O)(OH)$_2$, a group expressed by a formula of —P(=O)(OH)$_2$, or metal salt or an ester derivative of a group expressed by a formula of —P(=O)(OH)$_2$.

Examples of the halogen atom that is indicated by $R^1$ and/or $R^2$ include a fluorine atom, a chlorine atom, a bromine atom, an iodine atom, etc. Examples of the acyl group that is indicated by $R^1$ and/or $R^2$ include an acetyl group, a propionyl group, a butyryl group, an isobutyryl group, a valeryl group, an isovaleryl group, a pivaloyl group, a trifluoroacetyl group, a benzoyl group, etc.

Examples of the alkyl group that is indicated by $R^1$ and/or $R^2$ include a methyl group, an ethyl group, a propyl group, an isopropyl group, an n-butyl group, an isobutyl group, an s-butyl group, a t-butyl group, an n-pentyl group, an n-hexyl group, a cyclopentyl group, a cyclohexyl group, etc. Further, examples of the aryl group that is indicated by $R^1$ and/or $R^2$ include a phenyl group, a naphthyl group, a toluyl group, a 4-t-butylphenyl group, a biphenyl group, a phenanthryl group, an anthranil group, a triphenylenyl group, a pyrenyl group, etc. Examples of the aralkyl group that is indicated by $R^1$ and/or $R^2$ include a benzyl group, a phenethyl group, a naphthylmethyl group, a biphenylmethyl group, etc. Furthermore, examples of the heteroaryl group that is indicated by $R^1$ and/or $R^2$ include a pyridyl group, a quinolyl group, an isoquinolyl group, a pyrrolyl group, an indolyl group, a furyl group, a benzofuranyl group, a thienyl group, a benzothiophenyl group, etc.

With respect to the alkyl group, aryl group, aralkyl group, and heteroaryl group, the number of carbon atoms thereof is preferably in the range of 1 to 20, and more preferably in the range of 1 to 10.

In Formula (1) indicated above, when $R^1$ and/or $R^2$ denotes a hydroxyl group protected by a protecting group, examples of the protecting group that protects the hydroxyl group include: an alkyl group such as a methyl group, an ethyl group, a t-butyl group, etc.; an aralkyl group such as a benzyl group, etc.; an aryl group such as a phenyl group, etc.; an alkoxyalkyl group such as a methoxymethyl group, an ethoxyethyl group, etc.; an acyl group such as an acetyl group, a propionyl group, a benzoyl group, a trifluoroacetyl group, etc.; an alkoxycarbonyl group such as a methoxycarbonyl group, an ethoxycarbonyl group, a t-butoxycarbonyl group, a benzyloxycarbonyl group, etc.; a silyl group such as a trimethylsilyl group, a t-butyldimethylsilyl group, etc.; and a sulfonyl group such as a methanesulfonyl group, a p-toluenesulfonyl group, a trifluoromethane sulfonyl group, etc.

Specific examples of the hydroxyl group protected by a protecting group include: an alkoxy group such as a methoxy group, an ethoxy group, an isopropoxy group, a butoxy group, an s-butoxy group, a t-butoxy group, a pentyloxy group, a hexyloxy group, an allyloxy group, a benzyloxy group, etc.; an alkoxyalkyleneoxy group such as a methoxymethyleneoxy group, a methoxyethyleneoxy group, an ethoxyethyleneoxy group, etc.; an acyloxy group such as an acetyloxy group, a trifluoroacetyloxy group, a benzoyloxy group, etc.; an alkoxycarbonyloxy group or an aryloxycarbonyloxy group such as a methoxycarbonyloxy group, an ethoxycarbonyloxy group, a t-butoxycarbonyloxy group, a phenyloxycarbonyl group, a benzyloxycarbonyloxy group, etc.; a siloxy group such as a trimethylsiloxy group, a t-butyldimethylsiloxy group, etc.; and a sulfonyloxy group such as a methanesulfonyloxy group, a p-toluenesulfonyloxy group, a trifluoromethane sulfonyloxy group, etc.

When $R^1$ and/or $R^2$ indicates a mercapto group protected by a protecting group, specific examples thereof include an arylthio group and an alkylthio group such as a benzylthio group, a diphenylmethylthio group, a t-butylthio group, a 2,4-dinitrophenylthio group, etc.

When $R^1$ and/or $R^2$ indicates a carboxyl group protected by a protecting group, examples of the protecting group of the carboxyl group include an alkyl group such as a methyl group, an ethyl group, etc., and an aralkyl group such as a benzyl group, etc. Specific examples of the carboxyl group protected by a protecting group include an alkoxycarbonyl group such as a methoxycarbonyl group, an ethoxycarbonyl group, an isopropoxycarbonyl group, a butoxycarbonyl group, an s-butoxycarbonyl group, a t-butoxycarbonyl group, a pentyloxycarbonyl group, a hexyloxycarbonyl group, a benzyloxycarbonyl group, etc.

When $R^1$ and/or $R^2$ indicates an aldehyde group protected by a protecting group, specific examples thereof include a cyclic acetal protected by an alkylenedioxy group such as a methylenedioxy group, an ethylenedioxy group, etc.

When $R^1$ and/or $R^2$ indicates an amino group protected by a protecting group, specific examples thereof include groups expressed by the following formulae: —NHCOOCH$_3$, —NHCOO$^t$Bu, and —NHCOOCH$_2$Ph (Ph indicates a phenyl group).

Examples of the dialkylamino group indicated by $R^1$ and/or $R^2$ include a dimethylamino group, a diethylamino group, etc. Examples of the amide group indicated by $R^1$ and/or $R^2$ include an N,N-dimethylamide group, a benzamide group, an acetamide group, etc. Examples of the sulfonic ester group indicated by $R^1$ and/or $R^2$ include: sulfonic alkyl ester such as methyl sulfonate, ethyl sulfonate, t-butyl sulfonate, etc.; sulfonic aryl ester such as phenyl sulfonate, etc.; and sulfonic alkoxyalkyl ester such as ethoxyethyl sulfonate, etc.

When $R^1$ and/or $R^2$ indicates an ester derivative of a group derived from phosphoric acid or phosphorous acid, an ester group can be used that is expressed by a formula of —OP(=O)(OR$^3$)$_2$, a formula of —OP(=O)(OR$^3$)OH, a formula of —P(=O)(OR$^3$)OH, or a formula of —P(=O)(OR$^3$)$_2$. In this case, R$^3$ can be a hydrocarbon group such as, for example, —CH$_3$, —C$_2$H$_5$, —C$_{12}$H$_{25}$, —C$_{18}$H$_{37}$, —C$_{18}$H$_{35}$, —Ph, —C$_{12}$H$_{25}$, or —C$_{18}$H$_{37}$. Examples of R$^3$ include —OP(=O)(OCH$_3$)$_2$, —OP(=O)(OC$_2$H$_5$)$_2$, —OP(=O)(OC$_{12}$H$_{25}$)$_2$, —OP(=O)(OC$_{18}$H$_{37}$)$_2$, —OP(=O)(OC$_{18}$H$_{35}$)$_2$, —OP(=O)(OPh)$_2$, —OP(=O)(OC$_{12}$H$_{25}$)OH, —OP(=O)(OC$_{18}$H$_{37}$)OH, —OP(=O)(OC$_{18}$H$_{35}$)OH, —P(=O)(OCH$_3$)$_2$, —P(=O)(OC$_2$H$_5$)$_2$, —P(=O)(OC$_{12}$H$_{25}$)$_2$, —P(=O)(OC$_{18}$H$_{37}$)$_2$, —P(=O)(OC$_{18}$H$_{35}$)$_2$, —P(=O)(OPh)$_2$, —P(=O)(OC$_{12}$H$_{25}$)OH, —P(=O)(OC$_{18}$H$_{37}$)OH, —P(=O)(OC$_{18}$H$_{35}$)OH, etc.

$R^1$ and/or $R^2$ can be metal salt of the above-mentioned groups, specifically, metal salt of a carboxyl group, a sulfonic group, or a group expressed by a formula of —OP(=O)(OH)$_2$ or a formula of —P(=O)(OH)$_2$. In this case, the metal can be, for example, alkali metal such as lithium, sodium, potassium, etc.; alkaline earth metal such as magnesium, calcium, etc.; or metal that is at least trivalent, such as boron, aluminum, etc.

Furthermore, $R^1$ and/or $R^2$ can form a carbon-carbon double bond with the carbon atoms to which they are bonded. $R^1$ and/or $R^2$ also can form a ring with the carbon atoms to which they are bonded. The ring to be formed may be an aromatic ring or a nonaromatic ring. The ring to be formed can include a hetero atom such as an oxygen atom, a nitrogen atom, a sulfur atom, etc.

Examples of the aromatic ring to be formed of $R^1$ and $R^2$ together with the carbon atoms to which they are bonded include a benzene ring, a naphthalene ring, an anthracene ring, a pyridine ring, a pyrazine ring, a pyrrole ring, a quinoline ring, a furan ring, a pyran ring, a thiophene ring, an indole ring, a benzofuran ring, a benzothiophene ring, etc.

Examples of the nonaromatic ring to be formed of $R^1$ and $R^2$ together with the carbon atoms to which they are bonded include a cycloalkane ring such as cyclopropane, cyclopentane, cyclohexane, etc. and a cycloalkene ring such as cyclohexene, cyclooctene, cyclooctadiene, etc. The nonaromatic ring also can be a ring having a bridge head or crosslinked structure, for example, 2-norbornene, 2,5-norbornadiene, a norbornane ring, a bicyclo[2.2.2]octane ring, a bicyclo[2.2.2]octo-2-ene ring, a 7-oxabicyclo[2.2.1]heptane ring, a 7-azabicyclo[2.2.1]heptane ring, a 7-thiabicyclo[2.2.1]heptane ring, a 7-oxabicyclo[2.2.1]hept-2-ene ring, a 7-azabicyclo[2.2.1]hept-2-ene ring, or a 7-thiabicyclo[2.2.1]hept-2-ene ring. Furthermore, the nonaromatic ring can be a ring including a hetero atom, such as an oxirane ring, an aziridine ring, a thiirane ring, an oxolane ring, an azolidine ring, a dioxane ring, a morpholine ring, an oxathiolane ring, etc. Moreover, it can be cyclic acetal or cyclic ketal that is derived from diol of methylene acetal, ethylidene acetal, cyclopentylidene ketal, etc. Further examples thereof include: lactone formed through the condensation of a carboxyl group and a hydroxyl group; cyclic hemiacetal formed through the condensation of an aldehyde group and a hydroxyl group; acid anhydride formed through the condensation of two carboxyl groups; an imide group; and a lactam ring formed through the condensation of a carboxyl group and an amino group.

The alkyl group, the aralkyl group, the aryl group, and the heteroaryl group that $R^1$ and/or $R^2$ indicates as well as rings that include $R^1$ and $R^2$ may have the above-mentioned substituents. Specifically, these groups or rings may include a substituent such as a halogen atom, an acyl group, a hydroxyl group, a hydroxyl group protected by a protecting group, a carboxyl group, metal salt of a carboxyl group, a carboxyl group protected by a protecting group, a mercapto group protected by a protecting group, an aldehyde group protected by a protecting group, an amino group protected by a protecting group, a dialkylamino group, an amide group, a sulfonic group, metal salt of a sulfonic group, a sulfonic ester group, a group expressed by a formula of —OP(=O)(OH)$_2$, metal salt or an ester derivative of a group expressed by a formula of —OP(=O)(OH)$_2$, a group expressed by a formula of —P(=O)(OH)$_2$, metal salt or an ester derivative of a group expressed by a formula of —P(=O)(OH)$_2$, a nitro group, an isocyanate group, a carbodiimide group, an acid anhydride group, an imide group, a cyano group, etc.

The rings that are formed of $R^1$ and $R^2$ together with the carbon atoms to which they are bonded may be rings formed through condensation of the rings described above as examples or may include one or two N-hydroxyimide structures formed additionally.

The molecular weight of the N-hydroxyimide compound represented by Formula (1) is not particularly limited. However, it usually is about 3,000 or less, preferably 1,000 or less, more preferably 700 or less, and further preferably 500 or less.

Typical examples of the N-hydroxyimide compound represented by Formula (1) include N-hydroxysuccinimide, N-hydroxymaleimide, N,N'-dihydroxycyclohexanetetracarboxylic diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy het acid imide, N-hydroxy hymic imide, N-hydroxytrimellitic imide, N,N-dihydroxy pyromellitic diimide, etc. Among them, N-hydroxysuccinimide, N-hydroxymaleimide, N-hydroxyhexahydrophthalimide, N,N'-dihydroxycyclohexanetetracarboxylic diimide, N-hydroxyphthalimide, N-hydroxytetrachlorophthalimide, and N-hydroxytetrabromophthalimide are particularly preferable.

The N-hydroxyimide compound represented by Formula (1) is described in JP8(1996)-38909A, the pamphlet of WO00/35835, EP1055654A1, and JP2000-290312A, for example. Those compounds can be prepared, for instance, by allowing corresponding acid anhydride and hydroxyl amine to react with each other and then heating and dehydrating the ring-opened product thus obtained to close the ring thereof.

The amount of the N-hydroxyimide compound to be used for the oxygen absorber of the present invention is not particularly limited. However, it generally is in the range of 10 ppm to a weight equal to that of the oxidizable polymer, preferably in the range of 20 ppm to 50 wt %, and more preferably in the range of 100 ppm to 20 wt %, with respect to the oxidizable polymer.

When the oxidizable polymer to be used is a polymer including a tertiary carbon atom and/or a polymer including a carbon-carbon double bond, an oxygen absorber with excellent oxygen absorbency can be obtained even if a small amount of N-hydroxyimide compound is used. In this case, the amount of N-hydroxyimide compound can be 5 wt % or less (for example, 0.5 wt % or less) with respect to the oxidizable polymer. When the amount of N-hydroxyimide compound is 5 wt % or less (preferably 0.5 wt % or less) of the polymer, the harmful effect that is caused by elution of the N-hydroxyimide compound can be prevented from occurring. Furthermore, the N-hydroxyimide compound whose amount is 5 wt % or less of the polymer facilitates mixing them together uniformly. Particularly, when a polymer including a carbon-carbon double bond is used as the oxidizable polymer, the amount of the N-hydroxyimide compound can be 0.5 wt % or less with respect to the oxidizable polymer, which makes it possible to obtain a composition that is particularly preferable as a material for a packaging material.

The oxygen absorber of the present invention may include a metallic compound in addition to the oxidizable polymer and the N-hydroxyimide compound represented by Formula (1).

Examples of the metallic compound to be used herein include compounds of metals such as: alkali metal such as sodium, potassium, etc.; alkaline-earth metal such as magnesium, calcium, barium, etc.; polyvalent metal such as boron, aluminum, germanium, etc.; and transition metal such as manganese, iron, cobalt, nickel, copper, palladium, rhodium, ruthenium, vanadium, molybdenum, etc. Specifically, halogenides, hydroxides, oxides, nitrates, phosphates, sulfates, hydrogen sulfates, carbonates, or hydrogen carbonates of those metals can be used. Moreover, salts of those metals and organic acid such as carboxylic acid, etc. or complexes of those metals and various ligands may be used. Among them, compounds of metals of Groups 5 to 11 are preferable since they promote oxygen absorption. Specifically, cobalt compounds can be used including cobalt hydroxide, cobalt oxide, cobalt chloride, cobalt bromide, cobalt nitrate, cobalt sulfate, cobalt phosphate, cobalt carbonate, cobalt acetate, cobalt oxalate, cobalt propionate, cobalt butanoate, cobalt valerate, cobalt octanoate, 2-cobalt ethylhexanoate, cobalt benzoate, cobalt stearate, cobalt naphthylate, cobalt acetylacetonato, bis(2,3-butanedione dioxime)dichlorocobalt(II), tris(ethylene diamine)cobalt(III) sulfate, diamine trichloro(dimethylamine)cobalt(III), 2,2'-ethylenebis(nitrilomethylidyne)-diphenolato cobalt(II), bis(cyclopentadienyl)cobalt, 1,1'-dichlorobis(cyclopentadienyl)cobalt, etc.

Furthermore, the metal compound to be used herein can be a nickel compound such as nickel hydroxide, nickel oxide, nickel chloride, nickel bromide, nickel nitrate, nickel sulfate, nickel carbonate, nickel acetate, nickel oxalate, nickel propionate, nickel butanoate, nickel valerate, nickel octanoate, nickel 2-ethylhexanoate, nickel benzoate, nickel stearate, nickel acetylacetonato, dicarbonylbis(triphenylphosphine) nickel(0), bis(cyclopentadienyl)nickel, 1,1'-dichlorobis(cyclopentadienyl)nickel, etc.

The metal compound to be used herein also can be a palladium compound such as palladium hydroxide, palladium oxide, palladium chloride, palladium bromide, palladium nitrate, palladium sulfate, palladium carbonate, palladium formate, palladium acetate, palladium oxalate, palladium propionate, palladium butanoate, palladium valerate, palladium octanoate, palladium 2-ethylhexanoate, palladium benzoate, palladium stearate, palladium acetylacetonato, etc.

Moreover, the metal compound can be a copper compound such as copper hydroxide, copper oxide, copper chloride, copper bromide, copper iodide, copper nitrate, copper sulfate, copper phosphate, copper carbonate, copper acetate, copper oxalate, copper propionate, copper butanoate, copper valerate, copper octanoate, copper 2-ethylhexanoate, copper benzoate, copper stearate, etc.

The metal compound also can be a vanadium compound such as vanadium hydroxide, vanadium oxide, vanadium chloride, vanadium bromide, vanadium nitrate, vanadium sulfate, vanadium phosphate, vanadium carbonate, vanadium acetate, vanadium oxalate, vanadium propionate, vanadium butanoate, vanadium valerate, vanadium octanoate, vanadium 2-ethylhexanoate, vanadium benzoate, vanadium stearate, etc.

Further, the metal compound can be a molybdenum compound such as molybdenum hydroxide, molybdenum oxide, molybdenum chloride, molybdenum bromide, molybdenum nitrate, molybdenum sulfate, molybdenum phosphate, molybdenum carbonate, molybdenum acetate, molybdenum oxalate, molybdenum propionate, molybdenum butanoate, molybdenum valerate, molybdenum octanoate, molybdenum 2-ethylhexanoate, molybdenum benzoate, molybdenum stearate, etc.

The metal compound also can be a manganese compound such as manganese hydroxide, manganese oxide, manganese dioxide, manganese chloride, manganese bromide, manganese nitrate, manganese sulfate, manganese phosphate, manganese carbonate, manganese acetate, manganese oxalate, manganese propionate, manganese butanoate, manganese valerate, manganese octanoate, manganese 2-ethylhexanoate, manganese benzoate, manganese stearate, etc.

In addition, the metal compound also can be an iron compound such as iron hydroxide, iron oxide, iron chloride, iron bromide, iron nitrate, iron sulfate, iron phosphate, iron carbonate, iron acetate, iron oxalate, iron propionate, iron butanoate, iron valerate, iron octanoate, iron 2-ethylhexanoate, iron benzoate, iron stearate, iron naphthylate, iron acetylacetonato, ferrocene, 1,1'-dichloroferrocene, carboxyferrocene, 1,1-diphenylphosphinoferrocene, ferrocenyl tetrafluoroborate, tricarbonyl(cyclooctatetraene)iron, (η-bicyclo[2.2.1]hepta-2,5-diene)tricarbonyliron, etc.

Among those metal compounds, various cobalt salts are particularly preferable from the viewpoints of the cost efficiency and oxygen absorption efficiency.

The amount of the metal compound to be used is not particularly limited but is usually in the range of 0.001 to 0.1 mole, and preferably in the range of 0.005 mole to 0.05 mole, with respect to one mole of N-hydroxyimide compound.

The oxygen absorber of the present invention may contain various additives as long as the effects of the present invention can be obtained. Examples of the additives include a plasticizer, various oils, various mineral oils, a foaming agent, a nucleating agent, a lubricant, an antistatic agent, a colorant, a crosslinking agent, a flame retardant, a fungicide, a low constrictive agent, a thickener, a mold lubricant, an antifogging agent, a bluing agent, a silane coupling agent, a perfume, etc. Furthermore, the oxygen absorber of the present invention may contain a filler such as silica, silica alumina, alumina, talc, graphite, titanium dioxide, molybdenum disulfide, mica, etc. as required.

When the oxygen absorber of the present invention is to be produced, it is important that an N-hydroxyimide compound that is an oxidation catalyst and a metal compound to be used as required are dispersed uniformly in an oxidizable polymer. The method for producing the oxygen absorber of the present invention is described below using examples.

In a first method, a mixture is prepared that includes an N-hydroxyimide compound represented by Formula (1), an oxidizable polymer, and a solvent, and then the solvent is removed from the mixture. With the first method, the oxidizable polymer and the N-hydroxyimide compound can be dissolved or dispersed uniformly in the mixture. Furthermore, in the first method, when the solvent is removed after the mixture is applied to a base, an oxygen absorber film can be formed. In a second method, a mixture including an N-hydroxyimide compound represented by Formula (1) and a solvent is applied to an oxidizable polymer, and then the solvent is removed from the mixture that has been applied to the polymer. In this case, the form of the polymer is not particularly limited. It may be a film made of the polymer or a body formed of the polymer in a particular shape (for instance, in the shape of a container). These film and body may contain other materials in addition to the polymer.

The solvent is not particularly limited as long as it allows the above-mentioned methods to be carried out. Examples of usable solvents include: aliphatic hydrocarbons such as pentane, hexane, cyclohexane, heptane, octane, cyclooctane, decane, decalin, etc.; aromatic hydrocarbons such as benzene, toluene, xylene, mesitylene, etc.; ethers such as diethyl ether, diisopropyl ether, dibutyl ether, methyl t-butyl ether, tetrahydrofuran, 1,4-dioxane, tetrahydropyran, ethylene glycol dimethyl ether (DME), etc.; cellosolves such as ethylene glycol monomethyl ether, ethylene glycol monoethyl ether, etc.; esters such as methyl acetate, ethyl acetate, butyl acetate, etc.; carbonates such as dimethyl carbonate, diethyl carbonate, ethylene carbonate, propylene carbonate, etc.; ketones such as acetone, methyl vinyl ketone, methyl isopropyl ketone (MIPK), methyl isobutyl ketone, etc.; nitriles such as acetonitrile, propionitrile, benzonitrile, etc.; amides such as dimethylformamide, dimethylacetamide, etc.; alcohols such as methanol, ethanol, propanol, n-butanol, t-butanol, etc.; halogenated hydrocarbons such as chloroform, dichloromethane, chlorobenzene, dichlorobenzene, etc.; nitro compounds such as nitrobenzene, nitromethane, nitroethane, etc.; and water. Among them, hexane, toluene, tetrahydrofuran, diisopropyl ether, ethyl acetate, and acetone are preferable in that a less amount thereof remains in the oxygen absorber and they have excellent operability.

It is preferable that the solvent be used after being treated to have a sufficiently lowered dissolved-oxygen concentration. Preferably, a deaeration treatment or a treatment that is carried out by blowing an inert gas such as nitrogen, etc. is performed, for example.

The amount of the solvent to be used is preferably 2 to 1000 times (in weight ratio) the amount of the oxidizable polymer since it facilitates mixing the oxidizable polymer and the N-hydroxyimide compound uniformly. Furthermore, when consideration is given to the operability, cost efficiency, etc., it is further preferable that the amount of the solvent to be used be 2.5 to 200 times (in weight ratio) the amount of the oxidizable polymer.

The N-hydroxyimide compound may be brought into the form of minute powder before it is mixed with the oxidizable polymer.

Furthermore, it also is preferable that the N-hydroxyimide compound and the oxidizable polymer be mixed together after the N-hydroxyimide compound and/or the oxidizable polymer is dissolved or dispersed in a suitable solvent and thereby a solution or a dispersion is prepared.

The mixing of the oxidizable polymer and the N-hydroxyimide compound as well as the dispersion or dissolution thereof that is carried out as required can be performed using a container provided with a stirring means. The stirring means is not particularly limited but preferably is a turbine-type stirrer, a colloid mill, a homomixer, or a homogenizer from the viewpoint of producing a greater shearing force. They can be dispersed using a linemixier provided with a movable stirring apparatus or a non-movable inline mixer such as a "Static Mixer" (Trade Name; manufactured by Noritake Co., Ltd.).

The solvent can be removed under a normal pressure, preferably under a reduced pressure using a reaction vessel provided with a stirrer or a condenser, a rotary evaporator, etc. The degree to which the pressure is reduced in removing the solvent varies depending on the solvent to be used. However, in order to keep the N-hydroxyimide compound stable, it is preferable that the degree be adjusted so that the temperature of the solvent to be removed is 80° C. or lower, more preferably 50° C. or lower.

Furthermore, when both the oxidizable polymer and the N-hydroxyimide compound have been dispersed in a solvent, the solvent can be removed through filtration or centrifugal separation. Moreover, when both the oxidizable polymer and the N-hydroxyimide compound have been dissolved in a solution, it also is possible to employ a method in which this solution is added to a nonsolvent to allow the both to precipitate, or to employ a method in which the both is separated through crystallization, etc.

Methods that can be employed as a method of applying a solution of the N-hydroxyimide compound to the oxidizable polymer include well-known methods such as a cast method, a dipping method, a roll coating method, a spray method, a screen printing method, etc.

The oxygen absorber of the present invention also can be prepared by mixing the oxidizable polymer and the N-hydroxyimide compound together in the absence of any solvent, i.e. by so-called solid mixing. For the mixing, a mixer such as a Brabender, a jet mill, a ball mill, etc. can be used. The temperature at which the mixing is carried out is not particularly limited but is preferably 200° C. or lower and more preferably 80° C. or lower. When the temperature at which the mixing is carried out is higher, it is preferable that the mixing be carried out in an atmosphere including no oxygen, for example, in an atmosphere of inert gas such as nitrogen gas, argon gas, etc.

The oxygen absorber of the present invention also can be prepared by mixing the oxidizable polymer and the N-hydroxyimide compound together using a supercritical-state fluid as a medium.

A method is well known in which a base material made of various polymers is impregnated with a physiologically active substance, a monomer, etc. using a supercritical-state fluid as a medium. This method and the operating conditions are described in detail in U.S. Pat. Nos. 4,598,006, 4,820,752, JP8(1996)-506612A, and JP11(1999)-255925A, for example. The oxygen absorber of the present invention can be prepared through the operation that is carried out under the conditions described in such references.

Examples of usable supercritical-state fluid include carbon dioxide, nitrogen, ethane, propane, cyclohexane, ethanol, methanol, hexane, isopropanol, benzene, toluene, water, tetrafluoromethane, trichlorofluoromethane, chlorotrifluoromethane, tetrafluoromethylene, etc.

The metal compound and various additives to be added as required may be added to the oxidizable polymer before the N-hydroxyimide compound is added or may be added to the oxidizable polymer together with the N-hydroxyimide compound. Alternatively, the oxygen absorber is prepared that includes an oxidizable polymer and an N-hydroxyimide compound and then the metal compound and additives may be added thereto.

The metal compound and various additives may be added in the form of a solution that is prepared by dissolving them in a suitable solvent or in the form of a dispersion that is prepared by dispersing them in a suitable solvent, or they may be added through solid mixing. Such operations can be carried out using an apparatus such as one described above under the same conditions as those described above.

The oxygen absorber of the present invention can be used in various forms as required as long as the effects thereof can be obtained. The oxygen absorber of the present invention can be used, for instance, in the form of pellet or powder. Furthermore, the oxygen absorber of the present invention also can be used after being formed into various shapes such as shapes of films, plates, fibers, textiles, nonwoven fabrics, tubes, profile-molded products, etc.

For the formation, arbitrary forming methods can be used including extrusion molding, injection molding, press molding, blow molding, calender molding, casting, powder slash molding, wet spinning, melt spinning, etc. When a forming method that involves melting, such as the extrusion molding, injection molding, or melt spinning, is to be employed, it is preferable that the formation be carried out in an atmosphere including no oxygen by using an inert gas such as nitrogen gas or argon gas.

Further, it is preferable that an oxygen absorber formed in the shape of pellet or powder be stored in water or in an inert gas atmosphere as required.

The oxygen absorber of the present invention may be used in the form of a composite article (a layered structure or a composite structure) by being combined with other various materials (for instance, synthetic resin, rubber, metal, wood, ceramics, paper, fabric, etc.).

Specific examples of the above-mentioned other various materials to be used herein include various synthetic resins such as polyurethane, polyamide, polyester, polycarbonate, polyphenylenesulfide, polyacrylate, polymethacrylate, polyether, polysulfone, polyolefin, an ethylene-vinylalcohol copolymer, a polyvinyl-alcohol-based polymer, an acrylonitrile-styrene copolymer (AS resin), a styrene-maleic anhydride copolymer (SMA resin), rubber-reinforced polystyrene (HIPS resin), an acrylonitrile-butadiene-styrene copolymer (ABS resin), a methylmethacrylate-styrene copolymer (MS resin), a methylmethacrylate-butadiene-styrene copolymer (MBS resin), a vinyl-chloride-based polymer, a vinylidene-chloride-based polymer, a vinyl chloride-vinyl acetate copolymer, poly(vinylidene fluoride:phenol)resin, epoxy resin, etc. In addition, various synthetic rubbers also can be used including isoprene rubber, butadiene rubber, butadiene-styrene rubber, butadiene-acrylonitrile rubber, chloroprene rubber, butyl rubber, urethane rubber, silicone rubber, fluoro rubber, acrylonitrile rubber, etc. Moreover, metals such as iron, aluminum, copper, etc.; alloys such as stainless steel, etc.; and various metal plates such as a tin plate, a galvanized iron sheet, etc. also can be used.

Conventionally well-known forming methods such as a two color forming method or a core bag forming method can be used for the production of a composite article.

A composite article may be produced as follows. That is, a solution in which the oxygen absorber of the present invention have been dissolved or dispersed in a suitable solvent is applied to various base materials and then the solvent is removed by air drying, forced drying by heating, etc. The base materials to be used can be paper, a polyethylene film, a polypropylene sheet, a fabric made of polyester fiber or polyamide fiber, etc. The application of a liquid can be carried out by, for instance, spraying it using a spray gun, etc. or applying it using a gravure roller. When the base material is fabric or nonwoven fabric, a sheet-like composite article may be produced as follows. That is, the base material is impregnated with a solution in which the oxygen absorber of the present invention has been dissolved in a suitable solvent and then the solution is solidified using a nonsolvent as required.

The oxygen absorber of the present invention has excellent oxygen absorbency and is highly safe. Accordingly, it can be used for the purpose of oxygen absorption in various uses including, for instance: a pressurized airtight device; various food containers such as a bottle, a retort pouch, etc.; various food packaging materials, agricultural packaging materials, or packaging materials for medical use; a gasoline tank, a cosmetic container, a cap liner, a hose, or a tube; a sealing material such as an O-ring, a packing, a gasket, etc. Furthermore, a sheet or powder can be formed using the oxygen absorber of the present invention and then it can be used as an oxygen absorbent.

A packaging material of the present invention includes a part made of the oxygen absorber of the present invention. The packaging material of the present invention may have a shape of a cap or a bottle. Moreover, the packaging material of the present invention may be a multilayer film in which a layer made of the above-mentioned other materials and a layer made of the oxygen absorber of the present invention are stacked together.

EXAMPLES

Hereinafter, the present invention is described in detail using examples but is not limited by the following examples.

Example 1

After 3 g of polypropylene (J-allomer PL500A (trade name) manufactured by Japan Polyolefin) were dissolved in 100 ml of xylene, 15 mg of N-hydroxyphthalimide were added thereto, which then was mixed well together at 50° C. The solution thus obtained was applied to a glass sheet and then xylene was distilled off under a reduced pressure. Thus a film was obtained.

The film (with a size of 30 mm×50 mm×0.1 mm (thickness)) thus obtained was exposed to the air under the conditions including a temperature of 23° C. and a relative humidity of 50% for one week. It then was analyzed by infrared absorption spectrum. As a result, characteristic absorption corresponding to a hydroxyl group was observed around 3200 cm$^{-1}$ as a new peak. This result showed that polypropylene reacted with oxygen contained in the air and absorbed oxygen.

Example 2

First, 70 g of polypropylene (J-allomer PL500A (trade name) manufactured by Japan Polyolefin) and 0.35 g of N-hydroxyphthalimide were mixed well together in a nitrogen atmosphere at 180° C. using a Brabender. Then 1 g of the mixture thus obtained was put into an airtight container whose internal volume was 250 ml. This container was kept at 23° C. and then the amount of oxygen contained in the container was determined by gas chromatography. As a result, it was found that oxygen was reduced by 12.3 cc in 25 days.

Comparative Example 1

In this comparative example, the N-hydroxyphthalimide was not added, which is different from Example 2, and 1 g of polypropylene (J-allomer PL500A (trade name) manufactured by Japan Polyolefin) alone was put into an airtight container whose internal volume was 250 ml. This container was kept at 23° C. and then the amount of oxygen contained in the container was determined by gas chromatography. As a result, no reduction in amount of oxygen was found in 25 days.

Example 3

First, 70 g of polypropylene (J-allomer PL500A (trade name) manufactured by Japan Polyolefin), 0.35 g of N-hydroxyphthalimide, and 0.59 g of cobalt stearate were mixed well together (solid mixing) in a nitrogen atmosphere at 180° C. using a Brabender. Then 1 g of the mixture thus obtained was put into an airtight container whose internal volume was 250 ml. This container was kept at 23° C. and then the amount of oxygen contained in the container was determined by gas chromatography. As a result, it was found that oxygen was reduced by 17.2 cc in 25 days.

Example 4

A commercially available biaxially oriented film was prepared that contained a homopolymer of propylene as its main component. Next, 0.05 g of N-hydroxyphthalimide was added to 45 g of methanol to be dissolved uniformly in a nitrogen atmosphere at room temperature. The solution thus obtained was applied onto the film with a bar coater and then the solvent was removed with a vacuum dryer. In this manner, the N-hydroxyphthalimide was allowed to permeate through the film and thereby an oxygen absorber film (whose thickness was about 10 μm) was obtained. Then 1 g of the film thus obtained was put into an airtight container whose internal volume was 250 ml. This container was kept at 23° C. and then the amount of oxygen contained in the container was determined by gas chromatography. As a result, it was found that oxygen was reduced by 3.1 cc in 25 days.

Example 5

First, 0.35 g of N-hydroxyphthalimide was added to 70 g of polybutadiene (B-2000 (trade name) manufactured by Nippon Petrochemicals Co., Ltd.), which then was mixed well together in a nitrogen atmosphere at 180° C. using a Brabender. Then 1 g of the mixture thus obtained was put into an airtight container whose internal volume was 250 ml. This container was kept at 23° C. and then the amount of oxygen contained in the container was determined by gas chromatography. As a result, it was found that oxygen was reduced by 33.8 cc in 25 days.

Example 6

First, 0.35 g of N-hydroxyphthalimide was added to 70 g of polyoctenylene (VESTENAMER (trade name) manufactured by Degussa Co., Ltd.), which then was mixed well together in a nitrogen atmosphere at 180° C. using a Brabender. Then 1 g of the mixture thus obtained was put into an airtight container whose internal volume was 250 ml. This container was kept at 23° C. and then the amount of oxygen contained in the container was determined by gas chromatography. As a result, it was found that oxygen was reduced by 16.9 cc in 25 days.

Example 7

First, 0.35 g of N-hydroxyphthalimide was added to 70 g of styrene-isoprene-styrene triblock copolymer (HYBRAR (trade name) manufactured by KURARAY CO., LTD.), which then was mixed well together in a nitrogen atmosphere at 180° C. using a Brabender. Then 1 g of the mixture thus obtained was put into an airtight container whose internal volume was 250 ml. This container was kept at 23° C. and then the amount of oxygen contained in the container was determined by gas chromatography. As a result, it was found that oxygen was reduced by 26.1 cc in 25 days.

Example 8

First, 45g of mixture of water (30 wt %) and methanol (70 wt %) and 5 g of ethylene-vinylalcohol copolymer (EVAL (trade name) manufactured by KURARAY CO., LTD.) were put into a beaker, which then was heated to 80° C. while being stirred well. Thus a solution of the EVAL whose concentration was 10 wt % was prepared. Then 0.05 g of N-hydroxyphthalimide was added to the solution and was dissolved uniformly in a nitrogen atmosphere at room temperature. The solution thus obtained was applied onto a commercially available PET film that had been subjected to a corona treatment, using a bar coater. Thereafter, the solvent was removed with a vacuum dryer. Thus an oxygen absorber film (whose thickness was about 10 μm) was obtained. Then 1 g of the film thus obtained was put into an airtight container whose internal volume was 250 ml. This container was kept at 23° C. and then the amount of oxygen contained in the container was determined by gas chromatography. As a result, it was found that oxygen was reduced by 1.2 cc in 25 days.

Example 9

First, 100 g of toluene, 14.2 g (0.1 mole) of 5-cyclooctene-1,2-diol, 17.0 g (0.1 mole) of tetrahydrophthalic acid (4-cyclohexene-1,2-dicarboxylic acid), and 0.01 g of p-toluenesulfonic acid were put into a three-necked flask having an internal volume of 300 ml that was equipped with a water separator and a thermometer. They were allowed to react with each other at 120° C. for six hours while water produced thereby was removed. When 1.9 g of water were separated, the reaction was stopped and the reaction product was cooled to room temperature. Subsequently, the reaction product was washed three times with 100 ml of water and then toluene was distilled off under a reduced pressure. Thus 31.1 g of unsaturated polyester (with a molecular weight of about 1500) having a carbon-carbon double bond were obtained.

Then 5 mg of N-hydroxyphthalimide were added to 1 g of unsaturated polyester thus obtained, which then was mixed well together at room temperature. Thus an oxygen absorber was prepared. The oxygen absorber thus obtained was put into an airtight container whose internal volume was 250 ml. This container was kept at 23° C. and then the amount of oxygen contained in the container was determined by gas chromatography. As a result, it was found that oxygen was reduced by 5.8 cc in 25 days.

Example 10

The same operation as in Example 9 was carried out except that 14.2 g (0.1 mole) of 3-cyclohexene-1,1-dimethanol were used instead of 14.2 g (0.1 mole) of 5-cyclooctene-1,2-diol. Thus 32.7 g of unsaturated polyester (with a molecular weight of about 1500) having a carbon-carbon double bond were obtained.

Then 5 mg of N-hydroxyphthalimide were added to 1 g of unsaturated polyester thus obtained, which then was mixed well together at room temperature. Thus an oxygen absorber was prepared. The oxygen absorber thus obtained was put into an airtight container whose internal volume was 250 ml. This container was kept at 23° C. and then the amount of oxygen contained in the container was determined by gas chromatography. As a result, it was found that oxygen was reduced by 5.4 cc in 25 days.

Comparative Example 2

The same operation as in Example 9 was carried out using only 5-cyclooctene-1,2-diol and tetrahydrophthalic acid (4-cyclohexene-1,2-dicarboxylic acid) as raw materials without adding N-hydroxyphthalimide. Thus unsaturated polyester (with a molecular weight of about 1500) was obtained. This unsaturated polyester alone was put into an airtight container whose internal volume was 250 ml. This container was kept at 23° C. and then the amount of oxygen contained in the container was determined by gas chromatography. As a result, no reduction in amount of oxygen was found in 25 days.

INDUSTRIAL APPLICABILITY

Since the oxygen absorber of the present invention exhibits sufficiently high oxygen absorbency and is highly safe, it can be used for the purpose of oxygen absorption in various uses such as various containers, various packaging materials, sealing materials, etc. The oxygen absorber provided by the present invention is useful as an absorber that absorbs oxygen remaining in an airtight container, for example.

What is claimed is:

1. An oxygen absorber comprising a solid mixture comprising at least one N-hydroxyimide compound represented by Formula (1);

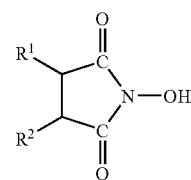

(1)

and at least one oxidizable polymer,
wherein $R^1$ and $R^2$ each independently indicates a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, an amino group protected by a protecting group, a dialkylamino group, an amide group, a sulfonic group, metal salt of a sulfonic group, a sulfonic ester group, a group expressed by a formula of —OP(=O)(OH)$_2$, metal salt or an ester derivative of a group expressed by a formula of —OP(=O)(OH)$_2$, a group expressed by a formula of —P(=O)(OH)$_2$, or metal salt or an ester derivative of a group expressed by a formula of —P(=O)(OH)$_2$, $R^1$ and $R^2$ may form a ring together with carbon atoms to which they are bonded, and $R^1$ and/or $R^2$ may form a carbon-carbon double bond with carbon atoms to which they are bonded.

2. The oxygen absorber according to claim 1, wherein at least one of the oxidizable polymers comprises a tertiary carbon atom.

3. The oxygen absorber according to claim 1, wherein the compound is N-hydroxyphthalimide.

4. A packaging material comprising a part made of an oxygen absorber according to claim 1.

5. A method for producing an oxygen absorber, comprising:
(i) preparing a mixture comprising at least one N-hydroxyimide compound represented by Formula (1):

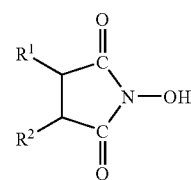

(1)

at least one oxidizable polymer, and a solvent; and
(ii) removing the solvent from the mixture, wherein a solid mixture comprising the N-hydroxyimide compound and the at least one oxidizable polymer is obtained, and
wherein $R^1$ and $R^2$ each independently indicates a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, a dialkylamino group, an amino group protected by a protecting group, an amide group, a sulfonic group, metal salt of a sulfonic group, a sulfonic ester group, a group expressed by a formula of —OP(=O)(OH)$_2$ or metal salt or an ester derivative thereof, or a group expressed by a formula of —P(=O)(OH)2 or metal salt or an ester derivative thereof, $R^1$ and $R^2$ may form a ring together with carbon atoms to which they are bonded, and $R^1$ and/or $R^2$ may form a carbon-carbon double bond with carbon atoms to which they are bonded.

6. A method for producing an oxygen absorber, comprising:
(i) applying a mixture to at least one oxidizable polymer, the mixture comprising at least one N-hydroxyimide compound represented by Formula (1):

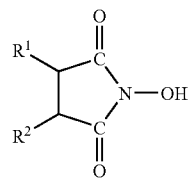

(1)

and a solvent; and
(ii) removing the solvent from the mixture applied to the polymer, wherein a solid mixture comprising the N-hydroxyimide compound and the at least one oxidizable polymer is obtained, and
wherein $R^1$ and $R^2$ each independently indicates a hydrogen atom, a halogen atom, an acyl group, an alkyl group, an aryl group, an aralkyl group, a heteroaryl group, a hydroxyl group, a hydroxyl group protected by a protecting group, a mercapto group protected by a protecting group, a carboxyl group, metal salt of a carboxyl group, a carboxyl group protected by a protecting group, an aldehyde group protected by a protecting group, a dialkylamino group, an amino group protected by a protecting group, an amide group, a sulfonic group, metal salt of a sulfonic group, a sulfonic ester group, a group expressed by a formula of —OP(=O)(OH)$_2$ or metal salt or an ester derivative thereof, or a group expressed by a formula of —P(=O)(OH)$_2$ or metal salt or an ester derivative thereof, $R^1$ and $R^2$ may form a ring together with carbon atoms to which they are bonded, and $R^1$ and/or $R^2$ may form a carbon-carbon double bond with carbon atoms to which they are bonded.

7. The oxygen absorber according to claim 1, wherein at least one of the oxidizable polymers has an aliphatic carbon-carbon double bond or a tertiary carbon atom.

8. The oxygen absorber according to claim 1, wherein the amount of N-hydroxyimide compound(s) is 5 wt % or less with respect to the oxidizable polymer(s).

9. The oxygen absorber according to claim 1, wherein the amount of N-hydroxyimide compound(s) is 0.5 wt % or less with respect to the oxidizable polymer(s).

10. The oxygen absorber according to claim 1, wherein the oxygen absorber additionally includes a metallic compound.

11. The oxygen absorber according to claim 10, wherein the metal compound comprises a cobalt salt.

12. The oxygen absorber according to claim 10, wherein the metal compound is present in an amount of 0.001 to 0.1 mol with respect to 1 mol of said N-hydroxyimide compound.

13. The oxygen absorber according to claim 1, wherein the N-hydroxyimide compound(s) is(are) uniformly dispersed in the oxidizable polymer(s).

* * * * *